United States Patent [19]
George

[11] 3,921,721
[45] Nov. 25, 1975

[54] PLASTIC HORSE SHOE AND METHOD OF ATTACHMENT

[76] Inventor: Albert J. George, 1684 Sutter Ave., Simi Valley, Calif. 93065

[22] Filed: Aug. 23, 1974

[21] Appl. No.: 500,063

[52] U.S. Cl. .................................. 168/4; 168/17
[51] Int. Cl.² ............................................ A01L 3/00
[58] Field of Search ..................... 168/4, 13, 17, 24

[56] References Cited
UNITED STATES PATENTS
3,524,505  8/1970  Ross.................................. 168/4
3,664,428  5/1972  Spencer............................. 168/4

Primary Examiner—Hugh R. Chamblee
Attorney, Agent, or Firm—Robert E. Geauque

[57] ABSTRACT

A horseshoe is adhered to the hoof by the employment of a physically and chemically unimpaired layer of thermosetting adhesive. This adhesive is cured by the employment of a formed heat source completely encapsulated by the horseshoe material.

19 Claims, 10 Drawing Figures

PLASTIC HORSE SHOE AND METHOD OF ATTACHMENT

BACKGROUND OF THE INVENTION

The basic shoeing procedure using metal shoes and nails has not changed for centuries. This method can cause many foot and leg ailments such as corns, bruises, lameness, nail pricks, quarter cracks, and other unsound conditions. Although attempts have been made to eliminate the metal shoe and/or the nails, they have proved practically unacceptable for general use. This is primarily due to the ineffectiveness of the adhesive under normal circumstances, i.e. exposure to water, urine, shock, repeated flexing, extremes of temperature, and other situational conditions. The methods and equipment employed in an attempt to produce a practically acceptable cure time have not been successful because of the inclusion of heat generating means within the adhesive or heat conducting apparatuses in contact with the adhesive. As defined herein, the term "cure" refers to that point at which the adhesive properties are such as to cause the shoe to be adhered to the hoof.

In U.S. Pat. No. 3,664,428 there is illustrated an embodiment wherein a U-shaped plate 30 is interposed between the plastic horseshoe and the horse's hoof. The plate is made of any suitable electrically resistive material such as a resistance metal or any other material having electrically resistive paths thereon to permit the completion of an electrical circuit for accelerating the curing of the adhesive which is applied to the plate. Obviously, there will be large temperature and heat variations along the metal plate due to the shorter inner path of lower resistance and to the presence of shape distorting holes which extend from the edge of the plate and sharply decrease the plate area causing much higher temperatures at these narrow plate locations. Also, the plate contains perforations which establish a weakened area for easy removal of the ends of the plate and result in a hot area due to the drastic reduction in width of the plate material conducting electrical current. Any one of these properties renders the plate unacceptable because of the large heat variations.

U.S. Pat. No. 3,782,473 suggests the use of external heating through the shoe to cure the adhesive and requires a "metal means" in the bond line, such as metal particles throughout the adhesive layer and external heating apparatuses. External heating has also been described in U.S. Pat. No. 3,524,505, but has not proved practical. The external heating apparatuses are too bulky and unwieldy to handle around an active horse, and are too slow because the plastic or rubber shoe acts as insulation against the transfer of heat. Even the inclusion of "metal means" will not allow for rapid and even heating. Additionally, the inclusion of metal foils, plates, wire mesh, and the like increases the bond line thickness and decreases adhesive strength, and makes more difficult the process of bonding to metal. The inclusion of metal particles in sufficient amounts to transfer heat reduces the adhesive strength below that requires to effect a lasting bond between hoof and shoe.

The introduction of plates and foils with holes and wire mesh increases the probability of adhesive disruption during curing and cooling, especially when dealing with a normal active horse that moves his foot. The introduction of these foreign apparatuses in the bond line increases the adhesive thickness and decreases adhesive bond and peel strength. It should be noted that any condition which increases the probability of adhesive failure, i. e. the shoe coming off, also increases the probability of serious accident to horse and rider.

The inclusion of foils, plates, wire mesh, and the like directly in the bond line increases the chance of adhesive distruption during curing and cooling. Movement during this period can cause weakened or destroyed bond strength. The addition of various parts and foreign substances in the adhesive bond line increases the chances of movement in this area when the horse moves. Employing a clamp decreases the probability of adhesive disruption but does not eliminate it.

The inclusion of foils, plates, wire mesh and the like in the adhesive bond line increases the number of surfaces which have to be bonded and introduces the need to bond to metal; a more difficult process than bonding to the shoe or hoof.

SUMMARY OF THE INVENTION

In general, the most desirable shoeing system should be flexible. When a horse walks, his heel spreads as weight is placed on his foot. This allows the frog, a triangular shaped spongy pad at the heel of the foot, to be pressed upon the ground and aids in "pumping" blood in the inner hoof. If the frog is made less efficient, or inoperative, circulatory problems may result. The employment of inflexible shoeing systems prevents the heel from spreading and allowing the frog to operate properly.

A satisfactory adhesive bond with necessary adhesive bond strength, peel strength and related adhesive properties requires a sufficiently thin adhesive bond line, a cure time of acceptable time and temperature parameters, and an absence of adhesive movement during curing and cooling.

Bond strength and peel strength increase with decreasing adhesive bond line thickness, i. e. the thickness of the adhesive between the shoe and hoof. To attain the necessary bond and peel strength, the adhesive bond line thickness should be less than 0.010 inch. Also, the thinner the adhesive bond line, the more rapid and complete the cure as well as requiring less adhesive.

Even, accurate heating is necessary because too high a heating temperature will decompose the adhesive while too low a temperature will not cure the adhesive in the necessary time, i.e. 3 minutes or less.

The present invention provides for the attachment of a flexible shoe to the horse's hoof with a strong adhesive bond. The heat generating source for curing the adhesive is completely embedded in the horse shoe itself so that it never contacts the adhesive. No other foreign substances are embedded in the adhesive layer so that the adhesive is free at all times from contact with any foreign substance. Preferably, the heating source is in the form of a resistant heating coil which is completely embedded below the surface of the horse shoe and passes back and forth around the horse shoe in order to uniformly heat the uncontaminated surface of the horse shoe to a uniform temperature throughout. After the shoe has adhered to the horse's hoof, the electrical leads to the heating coil are severed or disconnected, leaving the coil embedded in the shoe as an integral part of the shoe.

The adhesive is applied between the flexible shoe and a prepared flat surface of the hoof. The shoe is then pressed against the hoof and held in position against the hoof during the period of curing of the adhesive. After the leads are severed, the shoe can be cooled and is then ready to support the weight of the horse.

The present invention therefore overcomes the difficulties encountered with prior art as discussed above in that the adhesive is not disrupted during curing or cooling by the presence of plates, wire mesh, foils or other heating source in contact with the adhesive. Such prior heating sources increase the overall adhesive thickness and decrease the resulting adhesive bond and peel strength. The present invention also eliminates the uneven heating and temperature gradients which result from such prior heating sources so that even curing can be obtained with the present invention within a practically acceptable cure time period and the bond line can be held to the desired thickness without introducing an additional heat source surface to which the adhesive would have to bond.

Since the complete heat source is embedded within the horse shoe, no external heat source is required. Thus, the present invention provides a novel and practical flexible shoe and method of adhering same to a hoof in which no foreign substance is at any time or in any way in contact with the adhesive and no external heat source is required.

DESCRIPTION OF THE PREFERRED EMBODIMENT

Figure 1:
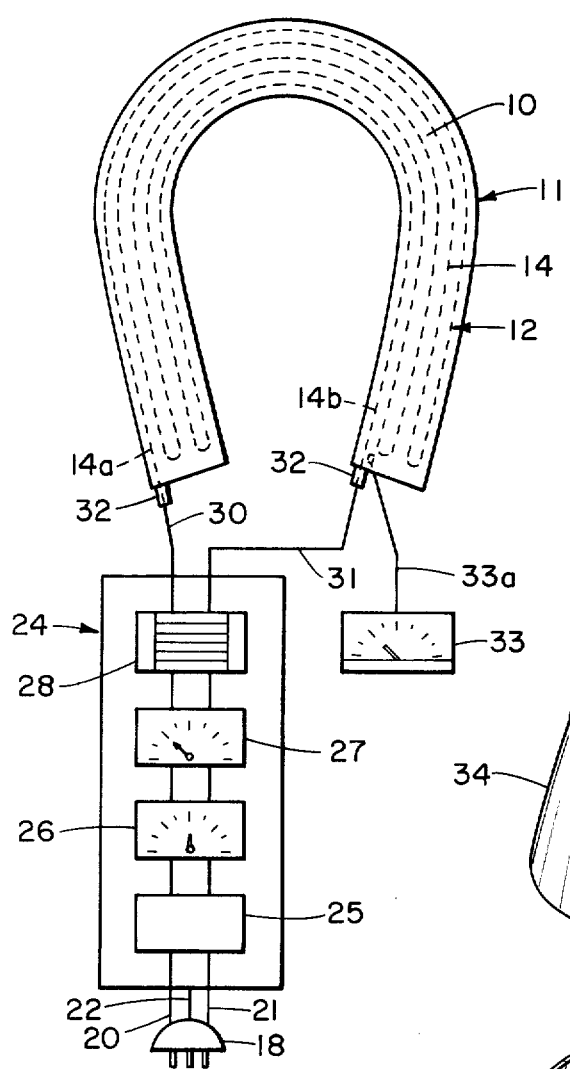
FIG. 1 is a schematic illustration of the source of electrical energy connected to the formed heat source encapsulated by the shoe.
Figure 2:
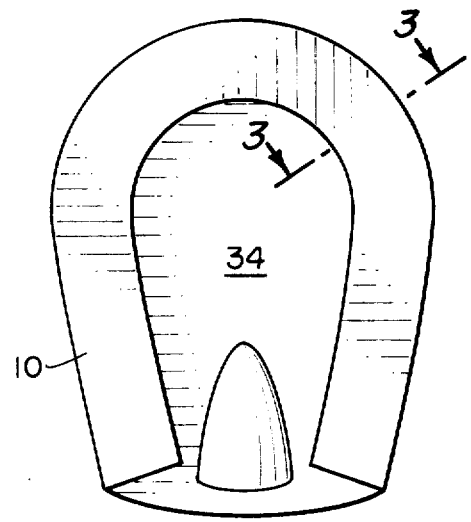
FIG. 2 is a bottom plan view of the shoe as illustrated in FIG. 1 after the shoe is adhered to the hoof.
Figure 4:
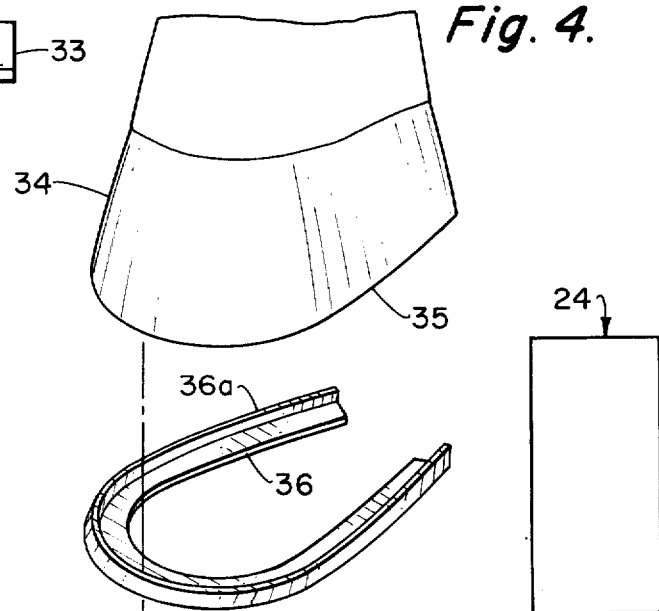
FIG. 4 is an expanded perspective view showing the relationship between the shoe, adhesive and hoof.

Referring to FIG. 1, a flexible horse shoe 11 has a ground engaging surface 10 and a formed heat source 12 is completely embedded in the horseshoe. Preferably, the horseshoe is constructed of a plastic material, such as polyurethane, but other flexible material, such as rubber, can be utilized.

The term "formed heat source" refers to an electrically conductive material formed into a configuration so as to emit a sufficiently even heat to cure or aid in the cure of an appropriate adhesive when the heat source is encapsulated in the shoe material and electrically stimulated. The illustrated heat source 12 comprises a single resistance wire 14 which extends back and forth in a horizontal plane extending over the width of the horseshoe and is entirely embedded in the shoe. When the ends of the wire 14 are connected to a source of electrical energy, the shoe surface 16, which is to be adhered to the hoof, is uniformly heated in order to cure the adhesive between the surface 16 and the hoof.

The source of electrical energy is made up of a standard three prong wall plug 18 connected with electrical wires 20 and 21 leading to control box 24 and with ground wire 22. The box 24 contains all standard components connected serially, commencing with fuse 25 connecter to internal timer 26. The fuse guards against an electrical overload and the timer 26 determines the length of the heating cycle. The timer 26 is connected to a variable transformer 27 which in turn is connected to a non-variable step-down transformer 28. The variable transformer 27 allows the household current voltage to be adjusted so as to supply the non-variable step-down transformer 28 with a suitable current, even with different incoming household line voltages. The non-variable step-down transformer 28 then reduces the voltage to a level suitable for producing the necessary formed heat source temperature and the output of transformer 28 is connected to formed heat source 12 by leads 30 and 31. The temperature produced within the shoe 11 is measured by the pyrometer 33 or the like. The optional pyrometer 33 and probe wire 33a aid in adjusting the formed heat source 12 to produce the temperature proper for the particular adhesive in use. Tempilstiks are an alternative to employing a pyrometer. Because the formed heat source's temperature is critical to proper adhesive curing, and variations in electrical current will cause variations in temperature, the capacity to control the current entering the formed heat source 12 is necessary. The components in the control box 24 provide an electrical current suitable to produce the necessary temperature from the encapsulated formed heat source 12 and provide for an adjustment capability necessary to compensate for differences in household current voltages in different geographical areas.

The basic electrical supply system in box 24 may have variations such as the inclusion of a voltmeter between the variable transformer 27 and the non-variable step-down transformer 28. Specific voltage readings from these meters can be correlated with specific temperatures produced in specific size and type shoes with encapsulated formed heat sources. Since the variable transformer 27 can adjust the household line current to that voltage reading which corresponds to the desired shoe temperature, repeated pyrometer readings for like shoes would be unnecessary. The input and output ends 14a and 14b, respectively, of wire 14 can connect with leads 30 and 31 respectively by means of plugs 32 or any other suitable connection.

When a horse is to be shod, the hoof 34 is first trimmed and shaped as per the standard method used by farriers, and wiped clean of any dirt, hoof filings, etc. A suitable adhesive 36 is then applied to the bottom surface 35 of hoof 34 and to the upper surface 16 of the shoe 11. A raised lip 40 extends from the outer edge of the upper surface of the shoe 11 to assist in locating the shoe on the hoof; the lip having a surface 41 forming a part of the upper surface. It is not necessary that the horseshoe have such a lip, but as later described, the lip aid in holding the shoe on the hoof.

The adhesive covered top shoe surface 16 is placed and held against the bottom adhesive covered hoof surface 35 by employing a suitable clamp, or by hand, while the foot is held up. The electrical source in box 24 is attached to the encapsulated formed heat source 12 via the leads 30 and 31, and the electrical source is actuated for the time appropriate for the adhesive to cure.

Figure 5A:
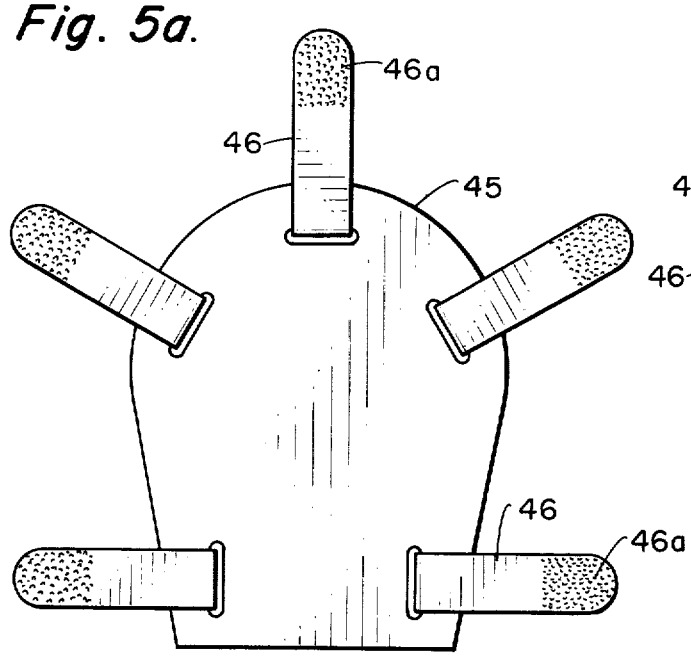
FIG. 5A is a top plan view of a clamping device for holding the shoe in place during curing of the adhesive.
Figure 5C:
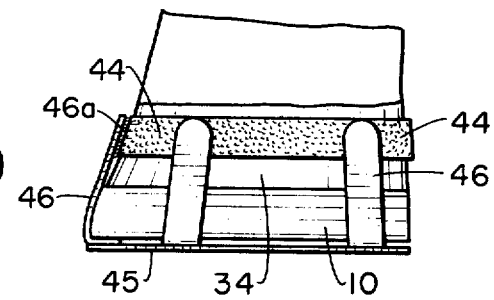
FIG. 5C is a vertical elevational view of the clamping device applied to the hoof.
Figure 5B:
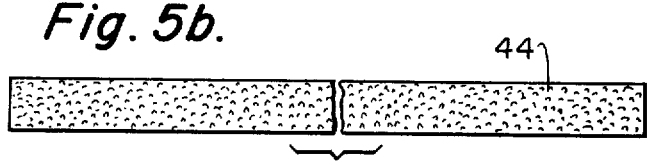
FIG. 5B is a top plan view of the strap which secures the clamping device to the hoof.

After the adhesive 36 is cured, the electrical source is disconnected and the shot 11 is cooled with water, dry ice, a cryogenic gas like Freon, or any other appropriate method. Rapid cooling is necessary because most horses are not conducive to standing on three legs for extended periods of time, and the adhesive must be returned to ambient temperature to demonstrate physical properties necessary for proper adhesion. After cooling, the clamp is removed. A suitable hoof clamp is illustrated in FIGS. 5A, 5B and 5C. Although not absolutely necessary, the use of some form of clamp is desirable because it reduces the probability of shoe movement during adhesive curing. Movement during this period can cause weakened or destroyed bond strength.

Before the shoe 11 with the adhesive 36 is placed on the hoof 34, a main anchoring strap 44 is secured around the hoof top about where the hoof 34 meets the leg hair. The main anchoring strap 44 (See FIG. 5B) is fabricated from Velcro tape and can be secured by pressing the overlapped ends together at the heel of the hoof 34. The clamps has a separate base plate 45 which is the approximate size of the hoof and a plurality of cinch straps 46 are attached to the base inwardly of its edge in any suitable manner (See FIG. 5A). The ends 46a of the straps are also made of Velcro material so that when the cinch straps 46 are pulled tightly toward the main anchoring strap 44, they can be pressed against and attached to strap 44 so that the cinch straps 46 hold the shoe 11 in place (See FIG. 5C). The lip 40 prevents deformation or change of shape of the shoe 11 when the straps 46 are tightened. The cinch straps 46 and the main anchoring strap 44 are separated by pulling apart with a peeling motion.

The adhesive may be a liquid, semi-solid or solid. Table 1 shows general specifications for an appropriate thermosetting polyurethane adhesive.

TABLE 1

| Gel Time | |
|---|---|
| $\leq$ 3 minutes at $\geq$300° F. | |
| Hardness, Shore "A" $\geq$ 80. | |
| Adhesive Strength (after full cure) | |
| Overlap shear, psi (pounds per square inch) | |
| Aluminum/Aluminum at 77°F. | |
| (acid etched) | 1,000 psi |
| Neoprene/Aluminum at 77°F. | Neoprene fails |
| Peel Strength, ppi | |
| (pounds per inch) | |
| Neoprene/Neoprene | > 20 |

Figure 7:
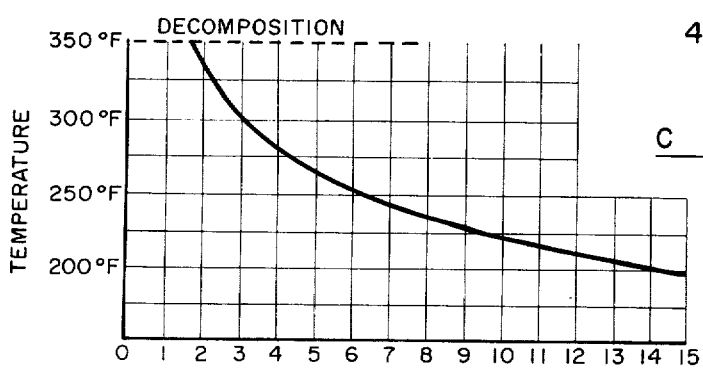
FIG. 7 is an ahdesive gel time graph.

An appropriate adhesive is "Uralane" 5738 A/Bx made by Furane Plastics, Los Angeles, Calif. Information concerning the requirements for storage, handling, etc. of this adhesive is contained in the Furane Technical Bulletin "Uralane 5738 A/BX, High-Strength, Moca Free Urethane Adhesive." FIG. 7 is and adhesive gel time graph for this adhesive.

Figure 3:
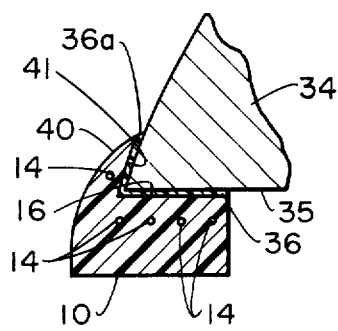
FIG. 3 is a partial vertical section of the hoof and shoe taken along line 3—3 of FIG. 2.
Figure 3:
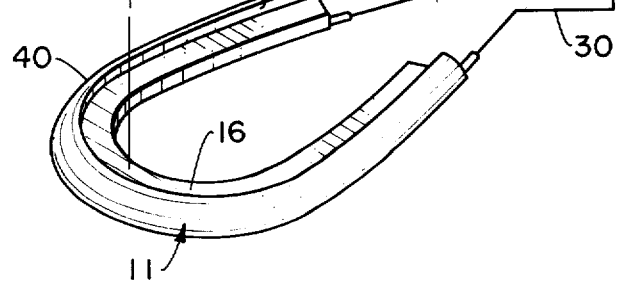
Figure 6:
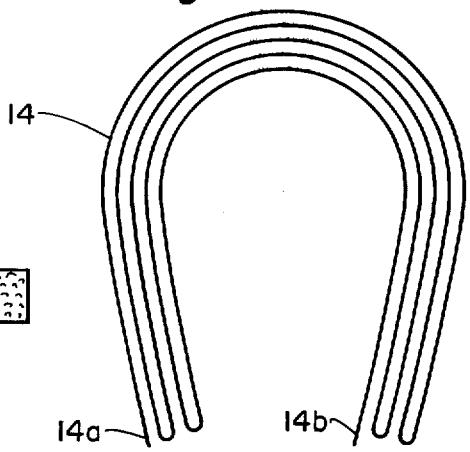
FIG. 6 is a top plan view of the formed heat source before it is embedded in the flexible shoe.

Referring in more detail to the invention, the formed heat source 12 is fabricated into the shape shown in FIG. 6. For the average shoe, a piece of 72 inch long, 20 gauge cooper wire can be used. The heat source 12 is then encapsulated in the shoe when it is molded of a suitable plastic or rubber such as polyurethane available under the name Monothane A80 marketed by Indpol of Cucamonga, Calif. In general, the shoe material must be able to withstand up to 350°F applied for 3 minutes and needs good abrasive resistance. The loops of resistance wire 14 are embedded in the shoe a distance below upper surface 16 which will produce the required curing temperature uniformly over the surface. The number of loops of wire can be varied to produce the desired uniform temperature. Referring to FIG. 3, the loops of wire 14 are preferably located about ⅛-3/16 of an inch below surface 16 with the outside wire being embedded in lip 40. Also, the individual wires are evenly spaced apart by about ⅛-3/16 of an inch to obtain uniform heating. To attain the necessary bond and peel strength, the adhesive bond line thickness should preferably be 0.010 inch or less. It is pointed out that the adhesive portion 36a is also present between the lip 40 and the lower outside edge of the hoof. Generally, a shoe of approximately one-half inch in thickness and 1 inch wide will give the necessary service time and a lip height of about three-eighths of an inch above the upper surface of the shoe is sufficient. It is understood that the above dimensions can be varied as desired.

With the foot, adhesive layer and shoe properly positioned together, the internal timer 26 can be set for about 3 minutes and actuated. When the timer turns the heating unit off, the shoe can be cooled with Freon. With 120 volts a. c. entering the control box 24, the variable transformer 27 is set to deliver 55 volts to the step-down transformer 28, which changes it to 5.5 volts and produces a temperature of about 325°F at the shoe surface. The temperature and times are for explanation purposes only and can be varied as required.

Necessary bond strength, peel strength and related adhesive properties require sufficiently thin adhesive bond line, a cure time of acceptable time and temperature parameters, and an absence of adhesive movement during curing and cooling. Bond strength and peel strength increase with decreasing adhesive bond line thickness, i. e. the thickness of the adhesive between the shoe and the hoof. Also, the thinner the adhesive bond line, the more rapid and complete the cure as well as requiring less adhesive. The bond line of precisely 0.010 inches or less produces satisfactory bonding strength.

It is evident that the formed heat source 12 encapsulated in the shoe material allows for these optimal conditions. Since there are no foreign substances, such as heat generating or conducting apparatuses interposed between the hoof 34 and shoe 11, the hoof 34 and shoe 11 with encapsulated formed heat source 12 can be brought together within the desired adhesive parameters. Because the formed heat source 12 is totally encapsulated, it cannot, at any time, contact the adhesive 36 in whole or in part and cause uneven heating. Accurate heating is necessary in that too high a heating temperature will decompose the adhesive 36 while too low a temperature will not cure the adhesive 36 in the necessary time. Referring to the graph of FIG. 7, if the adhesive temperature is maintained at about 325°F, a cure time of about 3 minutes is desired. The temperature in excess of 350°F will cause decomposition of the adhesive.

Figure 8:
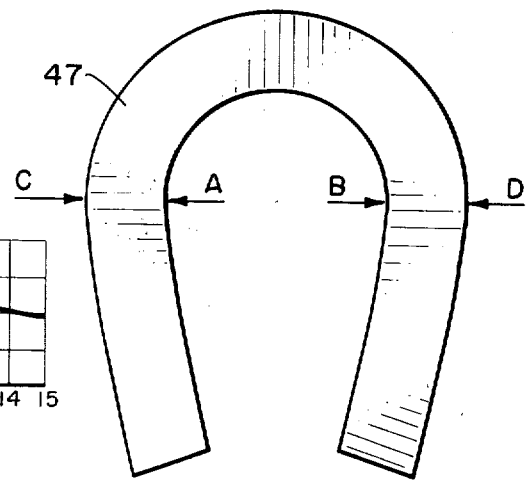
FIG. 8 is a plan view of a prior art heat source showing outside and inside conductive paths in horseshoe shaped objects.

FIG. 8 illustrates a prior art heat source comprised of a conductive plate 47. Electricity chooses the path of least resistance, which happens to be the inside edge of a horseshoe shaped heating unit. In other words, the distance from A. to B. along the inner edge is shorter than the distance from C. to D. along the outer edge. Thus, electricity will choose the shorter inner path of lower resistance and cause it to become hotter than the outer edge. The temperature difference could exceed 100°F resulting in uneven curing, i. e. lack of curing in some places and decomposing the adhesive in some places. This can result in a lowering of adhesive bond and peel strength below the minimum necessary to satisfactorily adhere the shoe to the hoof. The formed heat source 12 does not allow for a shorter or longer path. The formed heat source may have other forms such as a zig-zag or spiral design, as long as there is no "shorter path".

Because the formed heat source 12 is encapsulated, no "shorting out" against itself is possible during adhesive curing or flexing to form fit the shoe 11 to the hoof 34. There is also no possibility of formed heat source movement in the adhesive bond line while curing. Disruption of the adhesive material when it is cross linking, i. e. gelling, can result in weakened or destroyed bond strength.

Small variations in the diameter of the formed heat source wire 14 are likely in a production situation and areas of smaller diameter will heat slightly more than the areas of larger diameter. However, encapsulation of the formed heat source 14 automatically corrects these variations in that it averages the heat along the length of the wire. This averaging will allow the adhesive 36 to be heated within the parameter necessary for proper gel and cure.

When a horse locomotes he sometimes drags the front edge of his foot against the ground with a forward motion, or digs his foot's front edge into the ground. In the case of an adhered shoe without a bonded lip, the condition produces peel stress at the front edge, i. e. a stripping force acting upon the very edge of the bond line edge. Since adhesives usually have 10 or more times greater shear strength than peel strength, the substitution of shear stress for peel stress is desirable to decrease the probability of adhesive failure and possible injury to horse and rider. Shear stress is defined as the stress development in a polymer melt when the layers in a cross-section are gliding along each other or along the wall of the channel (in laminar flow).

The adhered lip 40 (See FIG. 3) makes for a shear stress at the foot's edge and sides. The stress development in the polymer occurs between the shoe lip 40 and the hoof 34 and the layers try to glide apart along each other when the horse drags or digs his foot.

What is claimed is:

1. A horseshoe for attachment to the hoof of a horse; said horseshoe being fabricated of a flexible material having wearing resistance properties;
   an adhesive bond between the upper surface of said horseshoe and the lower surface of the horse's hoof;
   a flexible formed heat source entirely embedded within said horseshoe for producing a substantially uniform adhesive curing temperature over said upper surface when connected to an energy source; and
   said formed heating source comprising a resistance heating wire completely embedded within said horseshoe in a wire pattern producing said uniform curing temperature when the ends of said wire are connected to a source of electrical energy.

2. A horseshoe as defined in claim 1 having a lip extended upwardly from the outside edge of the upper surface to engage the lower outside surface of said hoof.

3. A horseshoe as defined in claim 1 wherein thickness of said adhesive bond is not greater than approximately 0.010 inches.

4. A horseshoe as defined in claim 1, wherein said resistance heating wire extends back and forth within said horseshoe producing a plurality of wire loops located below said upper surface.

5. A horseshoe as defined in claim 4 wherein said wire pattern is located in a horizontal plane below said upper surface at a depth in the approximate range of ⅛ to 3/16 inches.

6. A horseshoe as defined in claim 4 wherein the ends of said resistance heating wire are connectable with and severable from an electrical energy source.

7. A horseshoe as defined in claim 5 wherein a portion of said heat source is located in said lip.

8. A method of shoeing a horse's hoof with a flexible horseshoe comprising the steps of:
   molding a flexible material into the shape of a horse's hoof to form a horseshoe;
   entirely embedding in said horseshoe a formed heat source;
   said embedding step including forming said formed heat source of a continuous resistance wire placed in a pattern within said horseshoe to produce a uniform temperature over the upper surface of said horseshoe;
   connecting the ends of said formed heat source to an electrical energy source;
   applying an adhesive to the bottom surface of the horse's hoof and the upper surface of the horseshoe; and
   placing and holding said surfaces together and energizing said electrical source the period of time required to maintain said upper surface at the curing temperature of said adhesive for the time required to cure said adhesive; and
   thereafter disconnecting said electrical energy source.

9. The method as defined in claim 8 including the step of selecting an adhesive having a gel time approximately equal to or less than three minutes at a temperature approximately equal to or greater than 300°F, said adhesive having a Shore hardnesss approximately equal to or greater than eighty.

10. The method as defined in claim 8 wherein said adhesive is applied to produce a bond thickness of approximately 0.010 inches or less.

11. The method as defined in claim 8 wherein said energizing step energizes said formed heat source for approximately 3 minutes to produce approximately 325°F at said upper shoe surface.

12. The method as defined in claim 8 including the step of rapidly cooling the shoe to ambient temperature after disconnecting said energy source.

13. The method as defined in claim 8 wherein said molding step includes placing an upwardly extending lip around the outside edge of said upper surface, said adhesive being also applied between said hoof and said lip.

14. The method as defined in claim 13 said embedding step includes embedding a portion of said formed heat source within said lip of said horseshoe.

15. The method of producing a flexible horseshoe comprising the step of;
   molding a flexible material into the shape of the bottom outside surface of a hoof to form a horseshoe;

entirely embedding in said horseshoe a formed heat source;

said embedding step including forming said formed heat source of a continuous resistance wire placed in a pattern within said horseshoe to produce a uniform temperature over the upper surface of said horseshoe.

16. The method as defined in claim 15 wherein said pattern is formed by extending said resistance wire back and forth within said horseshoe to produce a plurality of wire loops located below said upper surface.

17. The method as defined in claim 15 wherein said wire loops are placed in a horizontal plane at a uniform depth below said upper surface.

18. The method as defined in claim 15 wherein said molding step includes molding an upwardly extending lip around the outside edge of the upper surface of said horseshoe.

19. The method as defined in claim 18 wherein said embedding step includes embedding a portion of said formed heat source within said lip of said horseshoe.

* * * * *